(12) United States Patent
Lin et al.

(10) Patent No.: US 9,924,412 B2
(45) Date of Patent: Mar. 20, 2018

(54) METHOD OF HANDLING BUFFER STATUS REPORT AND COMMUNICATION DEVICE THEREOF

(75) Inventors: Shiang-Jiun Lin, New Taipei (TW); Chun-Chia Chen, New Taipei (TW); Tzu-Ming Lin, New Taipei (TW); Chun-Yen Wang, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 960 days.

(21) Appl. No.: 13/162,597

(22) Filed: Jun. 17, 2011

(65) Prior Publication Data
US 2011/0310800 A1 Dec. 22, 2011

Related U.S. Application Data

(60) Provisional application No. 61/356,237, filed on Jun. 18, 2010.

(51) Int. Cl.
*H04W 4/00* (2009.01)
*H04W 28/14* (2009.01)

(52) U.S. Cl.
CPC .................................. *H04W 28/14* (2013.01)

(58) Field of Classification Search
CPC .................................................... H04W 28/14
USPC ......................................................... 370/328
See application file for complete search history.

(56) References Cited

U.S. PATENT DOCUMENTS

| | | | |
|---|---|---|---|
| 2008/0064410 A1* | 3/2008 | Kwon et al. | 455/452.2 |
| 2009/0163211 A1* | 6/2009 | Kitazoe | H04W 74/0866 455/436 |
| 2009/0175229 A1 | 7/2009 | Tseng | |
| 2009/0219951 A1 | 9/2009 | Chun | |
| 2009/0232018 A1* | 9/2009 | Chun et al. | 370/252 |
| 2009/0285104 A1 | 11/2009 | Tseng | |
| 2010/0085926 A1* | 4/2010 | Harada et al. | 370/329 |
| 2010/0118720 A1* | 5/2010 | Gauvreau et al. | 370/252 |
| 2011/0242972 A1* | 10/2011 | Sebire et al. | 370/229 |
| 2011/0292873 A1* | 12/2011 | Guo | H04L 5/0007 370/328 |
| 2012/0057547 A1 | 3/2012 | Lohr | |

(Continued)

FOREIGN PATENT DOCUMENTS

CN 101547435 A 9/2009

OTHER PUBLICATIONS

Nokia Siemens Networks, Nokia Corporation: "BSR for Carrier Aggregation", 3GPP TSG-RAN WG2 Meeting #69bis, R2-102164, Apr. 12-16, 2010, Beijing, China, XP050422579.

(Continued)

*Primary Examiner* — Ayaz Sheikh
*Assistant Examiner* — Hai-Chang Hsiung
(74) *Attorney, Agent, or Firm* — Winston Hsu (57) ABSTRACT

A method of handling buffer status report for a mobile device capable of UL MIMO and/or capable of receiving and/or transmitting on a plurality of component carriers in a wireless communication system is disclosed. The method comprises generating at least a buffer size table each including a plurality of indexes according to the maximum uplink data transmission rate, wherein some of the plurality of indexes each is used for indicating a data amount in an uplink buffer of the mobile device for the buffer status report.

14 Claims, 8 Drawing Sheets

(56) References Cited

U.S. PATENT DOCUMENTS

2013/0114445 A1* 5/2013 Wen .................. H04L 5/0007
370/252

OTHER PUBLICATIONS

Alcatel-Lucent Shanghai Bell, Alcatel-Lucent: "BSR reporting in Carrier Aggregation", 3GPP TSG-RAN WG2 Meeting #70, R2-103277, May 10-14, 2010, pp. 1-4, Montreal, Canada, XP050423430.
Nokia Siemens Networks, Nokia Corporation: "BSR for Carrier Aggregation", 3GPP TSG-RAN WG2 Meeting #70, R2-102805, May 10-14, 2010, Montreal, Canada, XP050423147.

* cited by examiner

| Index | Buffer size |
|---|---|
| ⋮ | ⋮ |
| $I_1$ | $(B_0<)BS<=B_1(B_{min})$ |
| $I_2$ | $B_1<BS<=B_2$ |
| ⋮ | ⋮ |
| $I_n$ | $B_{n-1}<BS<=B_n(B_{max})$ |
| ⋮ | ⋮ |

| Index | Buffer size |
|---|---|
| ⋮ | ⋮ |
| $I_1$ | $(B_0<)BS<=B_1(B_{min})$ |
| $I_2$ | $B_1<BS<=B_2$ |
| ⋮ | ⋮ |
| $I_n$ | $B_{n-1}<BS<=B_n(B_{max})$ |
| ⋮ | ⋮ |

| Index | Buffer size |
|---|---|
| ⋮ | ⋮ |
| $I_1$ | $(B_0<)BS<=B_1(B_{min,1})$ |
| $I_2$ | $B_1<BS<=B_2$ |
| ⋮ | ⋮ |
| $I_{N1}$ | $B_{N1-1}<BS<=B_{N1}(B_{max,1})$ |
| $J_1$ | $(C_0<)BS<=C_1(B_{min,2})$ |
| $J_2$ | $C_1<BS<=C_2$ |
| ⋮ | ⋮ |
| $J_{N2}$ | $C_{N2-1}<BS<=B_{N2}(B_{max,2})$ |
| ⋮ | ⋮ |
| $K_1$ | $(D_0<)BS<=D_1(B_{min,y})$ |
| $K_2$ | $D_1<BS<=D_2$ |
| ⋮ | ⋮ |
| $K_{Ny}$ | $D_{Ny-1}<BS<=B_{Ny}(B_{max,y})$ |
| ⋮ | ⋮ |

Segment #1 (rows $I_1$ through $I_{N1}$)
Segment #2 (rows $J_1$ through $J_{N2}$)
Segment #y (rows $K_1$ through $K_{Ny}$)

METHOD OF HANDLING BUFFER STATUS REPORT AND COMMUNICATION DEVICE THEREOF

CROSS REFERENCE TO RELATED APPLICATIONS

This application claims the benefit of U.S. Provisional Application No. 61/356,237, filed on Jun. 18, 2010 and entitled "Methods and Systems for Buffer Status Report" the contents of which are incorporated herein in their entirety.

BACKGROUND OF THE INVENTION

1. Field of the Invention

The application relates to a method utilized in a wireless communication system and a communication device thereof, and more particularly, to a method of handling buffer status report in a wireless communication system and a related communication device.

2. Description of the Prior Art

Long Term Evolution wireless communication system (LTE system), an advanced high-speed wireless communication system established upon the 3G mobile telecommunication system, supports only packet-switched transmission, and tends to implement both Medium Access Control (MAC) layer and Radio Link Control (RLC) layer in one single communication site, such as in Node B (NB) alone rather than in NB and RNC (Radio Network Controller) respectively, so that the system structure becomes simple.

In LTE, MAC provides transmission services via a plurality of logic channels. To manage uplink resources, when a user equipment (UE) performs uplink (UL) transmission, the network can divide or map logical channels of the UE into at most four groups based on priorities, types, QoS and so on. The 3rd Generation Partnership Project, 3GPP, introduces a buffer status reporting (BSR) procedure, which is used to provide enhanced NB (eNB) with information about an amount of data in UL buffer (hereafter called a buffer size) of a logical channel group in the UE. Note that, the buffer status report is realized by reporting an index in a buffer size table (BST) for indicating the buffer size of the logical channel group. Beside, the UE can report at most four buffer size table indexes in the buffer status report.

Toward advanced high-speed wireless communication system, such as transmitting data in a higher peak data rate, LTE-Advanced system is standardized by the 3rd Generation Partnership Project (3GPP) as an enhancement of LTE system. LTE-Advanced system targets faster switching between power states, improves performance at the cell edge, and includes subjects, such as bandwidth extension, coordinated multipoint transmission/reception (COMP), uplink multiple input multiple output (MIMO), etc.

For bandwidth extension, carrier aggregation is introduced to the LTE-Advanced system for extension to wider bandwidth, where two or more component carriers are aggregated, for supporting wider transmission bandwidths (for example up to 100 MHz) and for spectrum aggregation. According to carrier aggregation capability, multiple component carriers are aggregated into overall wider bandwidth, where the UE can establish multiple links corresponding to the multiple component carriers for simultaneously receiving and/or transmitting.

In the LTE system, a buffer size table is defined for the UE supporting a single component carrier. The index numbers of the buffer size table are represented by 6 bits (e.g. index='0'-'63'), and each index number indicates a buffer size value. For example, the index='0' indicates buffer size value is 0 byte (e.g. BS=0), the index='1' indicates buffer size value is greater than 0 and is less or equal to 10 bytes (0<BS<=10), and so on. Note that, for the greatest index number (index='63') in the buffer size table, the buffer size value is indicated greater than 150000 bytes (BS>150000). For the UE supporting only one component carrier, the 6-bit buffer size table is sufficient for buffer status report. However, in the LTE-Advanced system, the UE supports multiple component carriers and UL MIMO, and thereby the transmission data rate is extremely enhanced. Thus, the 6-bit buffer size table is not sufficient for representing the buffer size value of a logical channel group in multiple component carriers. Improper indication may cause that the network (e.g. an eNB) allocates insufficient resource to the UE for data transmission.

Considering a scenario, the buffer size value of the logical channel group in the LTE-Advanced system is greatly larger than 150000 byte (e.g. reaching to 3000000 bytes). Based on the 6-bit buffer size table, the UE reports index='63' in the buffer status report. In this situation, resource allocated by the network to the UE for uplink transmission is not enough since the network does not know accurate buffer size value.

SUMMARY OF THE INVENTION

The application discloses a method of handling buffer status report in a wireless communication system and a related communication device in order to solve the above-mentioned problem.

A method of handling buffer status report for a mobile device capable of UL MIMO and/or capable of receiving and/or transmitting on a plurality of component carriers in a wireless communication system is disclosed. The method comprises generating at least a buffer size table each including a plurality of indexes according to the maximum uplink data transmission rate, wherein some of the plurality of indexes each is used for indicating a data amount in an uplink buffer of the mobile device for the buffer status report.

A communication device of a wireless communication system for handling buffer status report is disclosed. The communication device is capable of UL MIMO and/or capable of receiving and/or transmitting on a plurality of component carriers and comprises means for receiving and/or transmitting data from at least a component carrier of the plurality of component carriers, and means for generating at least a buffer size table each including a plurality of indexes according to the maximum uplink data transmission rate, wherein some of the plurality of indexes each is used for indicating a data amount in an uplink buffer of the mobile device for the buffer status report.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
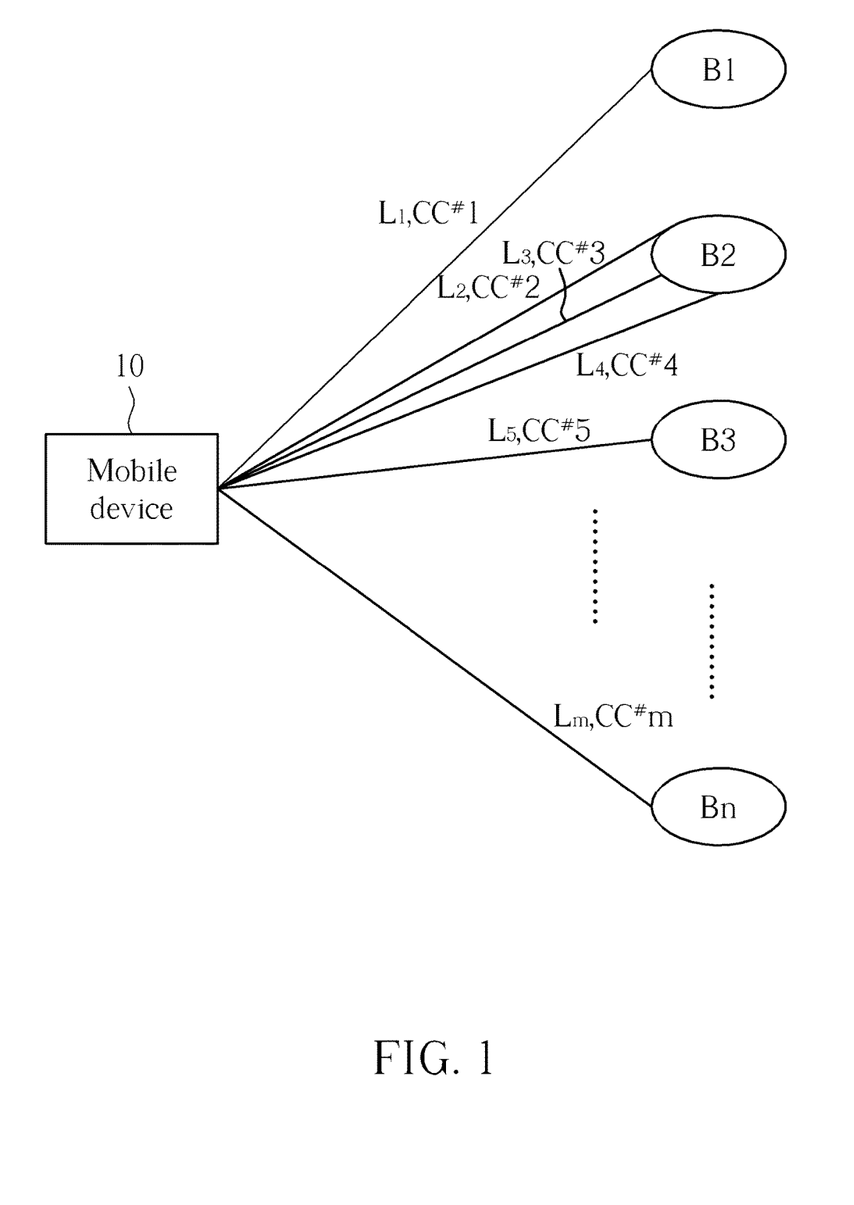
FIG. 1 illustrates a schematic diagram of an exemplary wireless communication system.

Please refer to FIG. 1, which illustrates a schematic diagram of a wireless communication system featuring multiple connections between a mobile device 10 and base stations B1-Bn. The wireless communication system may be a LTE-Advanced system (i.e. an evolved universal terrestrial radio access network (E-UTRAN)) or any other similar network system. The mobile device 10 can operate with carrier aggregation. In FIG. 1, the mobile device 10 communicates with the base stations B1-Bn through radio links $L_1$-$L_m$ that correspond to component carriers cc#1-cc#m configured in the mobile device 10 respectively. Each of the component carriers cc#1-cc#m corresponds to a radio frequency (RF) channel whose bandwidth may be varied according to different communication systems. In addition, the mobile device 10 is referred as a user equipment (UE) or a mobile station (MS), and can be a device such as a mobile phone, a computer system, etc.

For performing uplink transmission, the UE needs to report buffer status report to the network (i.e. the eNB), so that the network can allocate uplink resource to the UE for transmission according to the buffer status report. Besides, the buffer status report may be triggered by one of the following events:

1. Explicit signalling: the network sends a dedicated message to command the UE to report the buffer status.

2. Component carrier configuration change: the buffer status report is triggered when a component carrier is added or removed or when a component carrier is activated or deactivated.

3. Handover procedure: after moving from one cell/network to another cell/network, the UE reports the buffer status.

4. Contention-based transmission: the UE reports the buffer status report in the resource when a contention-based resource is allocated. In other embodiments, the UE reports the buffer status report in the Message 3 in a random access procedure.

5. Uplink data, which belongs a logical channel with higher priority, becomes available for transmission.

6. Uplink data becomes available for transmission and there is not data available for transmission for any of the logical channels.

7. Uplink resource is allocated and the number of padding bits is larger or equal to the size of the buffer status report.

8. Timer based triggering: the UE reports the buffer status report periodically when a periodical buffer status report timer expires, or when a predefined timer expires and the UE has data available for transmission for any of the logical channels which belong to a logical channel group.

9. Initial entry to the network: the UE reports the buffer status report when initially entering the network.

Figure 2:
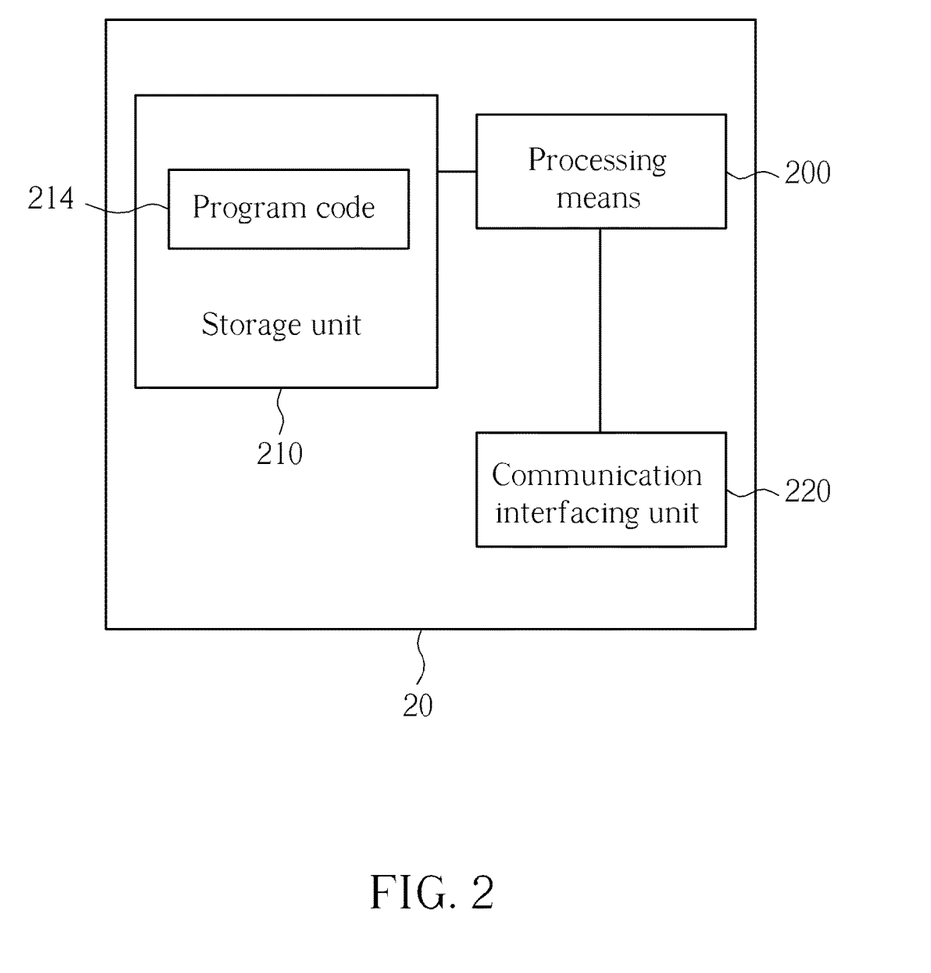
FIG. 2 illustrates a schematic diagram of an exemplary communication device.

FIG. 2 illustrates a schematic diagram of an exemplary communication device 20. The communication device 20 can be the mobile device 10 shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that can store program code 214, for access by the processing means 200. Examples of the storage unit 210 include but are not limited to a subscriber identity module (SIM), read-only memory (ROM), flash memory, random-access memory (RAM), CD-ROMs, magnetic tape, hard disk, and optical data storage device. The communication interfacing unit 220 is preferably a radio transceiver and can exchange wireless signals with the network according to processing results of the processing means 200.

In order to avoid insufficient resource allocation in multiple component carrier systems (e.g. the LTE-A system, the IMT Advanced system, etc.) due to inaccurate buffer size indication, the applicant provides a method for handling buffer status report as following.

Figure 3:
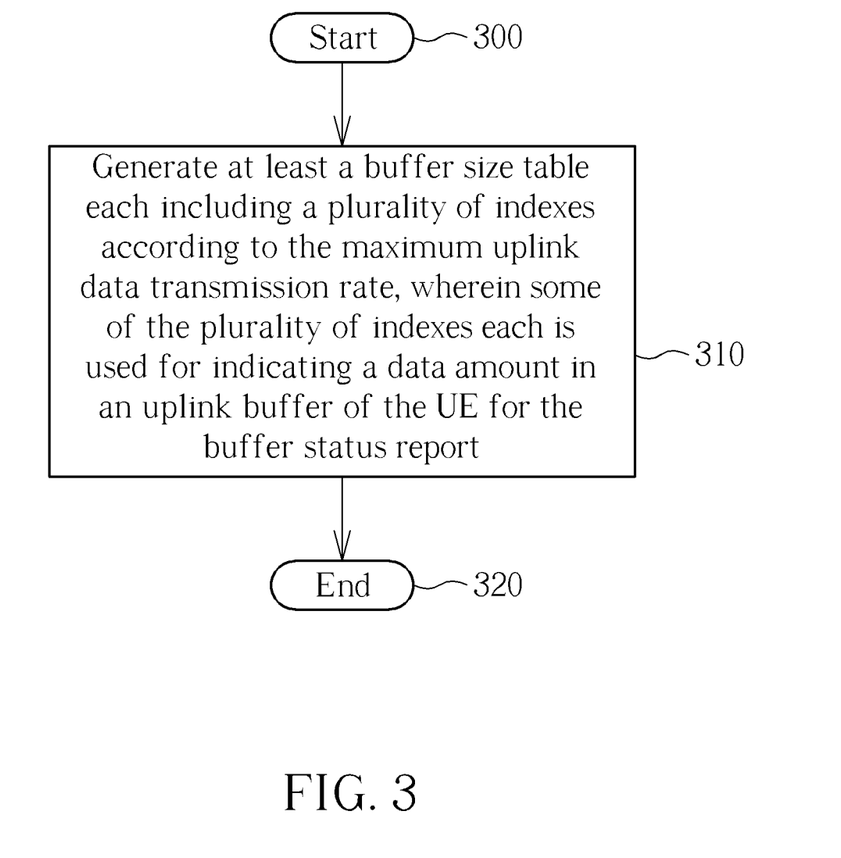
FIG. 3 is a flowchart of an exemplary process.

Please refer to FIG. 3, which illustrates a flowchart of an exemplary process 30. The process 30 is utilized in a UE (as the mobile device 10 of FIG. 1) capable of UL MIMO or capable of communicating with the network through a plurality of component carriers, for handling buffer status report. The process 30 can be compiled into the program code 214 and includes the following steps:

Step 300: Start.

Step 310: Generate at least a buffer size table each including a plurality of indexes according to the maximum uplink data transmission rate, wherein some of the plurality of indexes each is used for indicating a data amount in an uplink buffer of the UE for the buffer status report.

Step 320: End.

According to the process 30, the UE generates one or more buffer size tables for the buffer status report according to the maximum uplink data rate, so as to provide sufficient index number to indicate the buffer size of the logical channel group. The buffer size tables may be generated by different functions or procedures associated to the maximum uplink data rate, and thereby the buffer size tables may have different number of fields (e.g. index field). Note that, the generated buffer size tables may be stored in the eNB and the UE, and the functions or procedure may be known by both the network (i.e. an eNB) and the UE.

Figure 4:
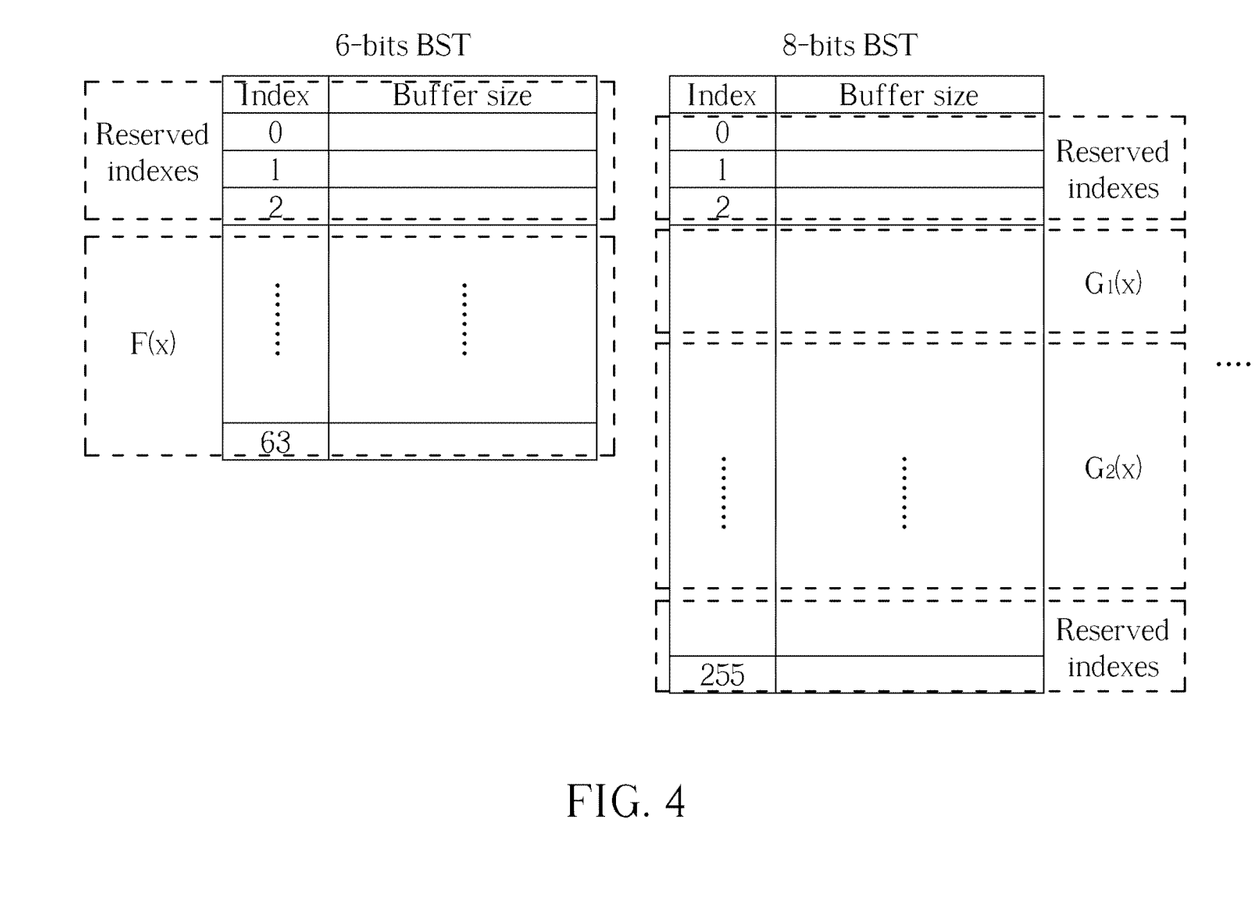
FIG. 4 illustrates a schematic diagram of buffer size table generation.

Take an example based on the process 30. Referring back to FIG. 1, the UE is configured a number of "m" component carriers, and thereby the size of data that is buffered in a logical channel group for transmitting on the "m" component carriers may not be accurately indicated by the conventional buffer size table. The detailed description can be referred from above, so it is not given herein. Thus, the UE generates at least a buffer size table based on the maximum uplink data rate, so as to provide more accurate information about the size of data (hereafter called buffer size) for the logical channel group, so that the network may not allocate insufficient resource to the UE for uplink transmission. Please refer to FIG. 4, which illustrates a schematic diagram of buffer size table generation. The UE can generate different number of bits of buffer size tables to represent index numbers. In FIG. 4, the UE generates a 6-bit buffer size table and a 8-bit buffer size table. That is, index number of the 6-bit buffer size table is from '0' to '63', and index number of the 8-bit buffer size table is from '0' to '255'. Moreover, a buffer size table (e.g. the 6-bit and/or 8-bit buffer size table) can be generated by at least a function or procedure. For example, the 6-bit buffer size table is generated by one procedure F(x) and the 8-bit buffer size table is generate by procedures $G1(x)$ and $G2(x)$.

In addition, in an embodiment, all of the indexes are used for indicating the buffer size of the logical channel group. However, in some embodiments, some indexes may be reserved for other purpose. For example, an index is used for indicating that the buffer size exceeds or is less than a predetermined value (e.g. the minimum buffer size value, or the maximum buffer size value in a buffer size table), for indicating the status of the sum of all uplink buffers of the UE (e.g. the sum of total buffer sizes is above or less than a threshold), or for asking the eNB to add or remove the component carrier(s) (e.g. adding a new component carrier cc#m+1, or removing component carrier cc#1 in FIG. 1).

There are several methods for generating the buffer size table. Please refer to FIG. 5, which illustrates a buffer size table according to a first embodiment. A part of the buffer size table is generated by a geometric sequence formula f(x), which is expressed as $a_i=a_1*r^{(i-1)}$). Suppose that the minimum buffer size value is $B_{min}$ and the maximum buffer size value is $B_{max}$, and perform the following steps to generate the buffer size table.

Figure 5:
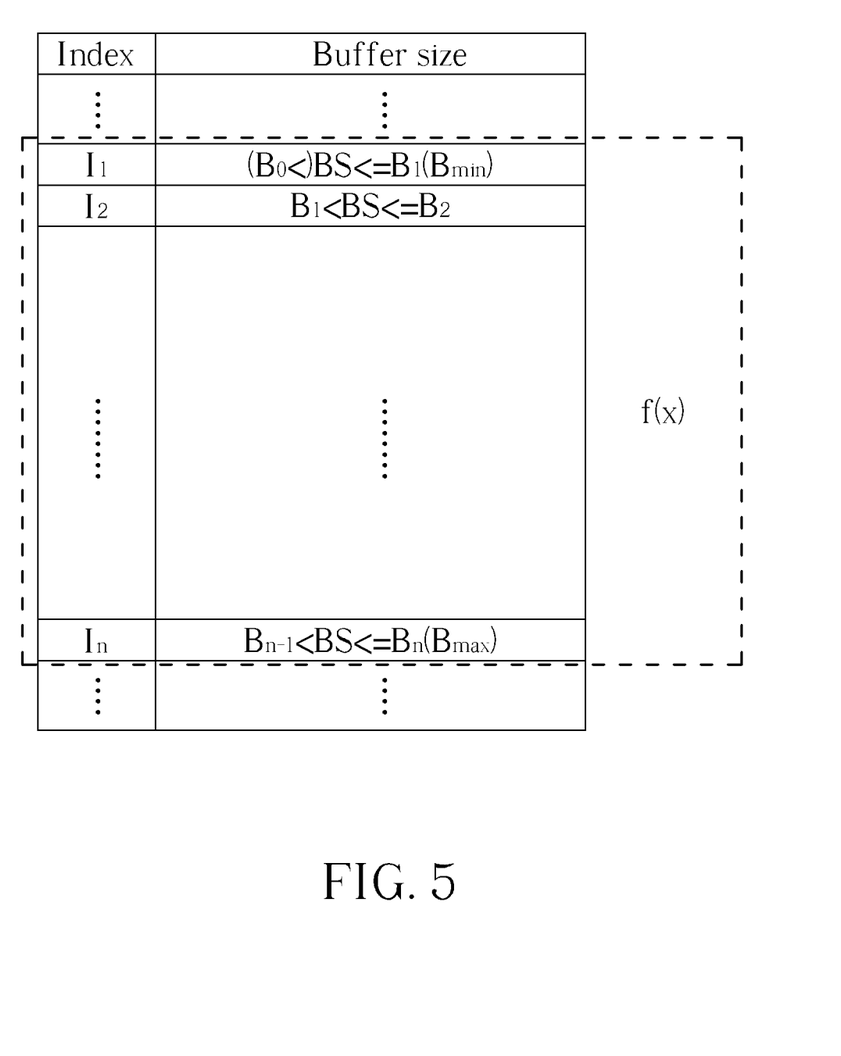
FIG. 5-FIG. 7 illustrate schematic diagrams of buffer size tables according to different embodiments.

Step 1: Consider a geometric sequence $a_1, a_2, \ldots a_n$, where $a_1=B_{min}$, $a_2=B_2$, ... and $a_n=B_{max}$.

Step 2: Derive the ratio of the geometric sequence by $r=(B_{max}/B_{min})^{1/(n-1)}$.

Step 3: Get $a_i$ by the geometric sequence formula $f(x)=a_1*r^{(i-1)}$, for $1<i<n$.

Step 4: Set the buffer size value $B_i$ to be ceiling($a_i$) (or floor($a_i$)).

For example, assume the $B_0=0$ byte, $B_{min}=10$ byte, $B_{max}=3000000$ byte, n=62. Therefore, index='$1_1$' indicates 0<BS<=10, index='$1_2$' indicates 10<BS<=13, . . . , index='$1_{61}$' indicates 1984009<BS<=2439678 and index='$1_{62}$' indicates 2439678<BS<=3000000. For completeness, index='$1_0$' can be used to indicate BS=0, and index='$1_{63}$' indicates BS>3000000. With enlarged buffer size table, the buffer size of the logical channel group can be indicated precisely in the LTE-Advance system, so as to avoid that the network allocated insufficient resource to the UE.

Figure 6:
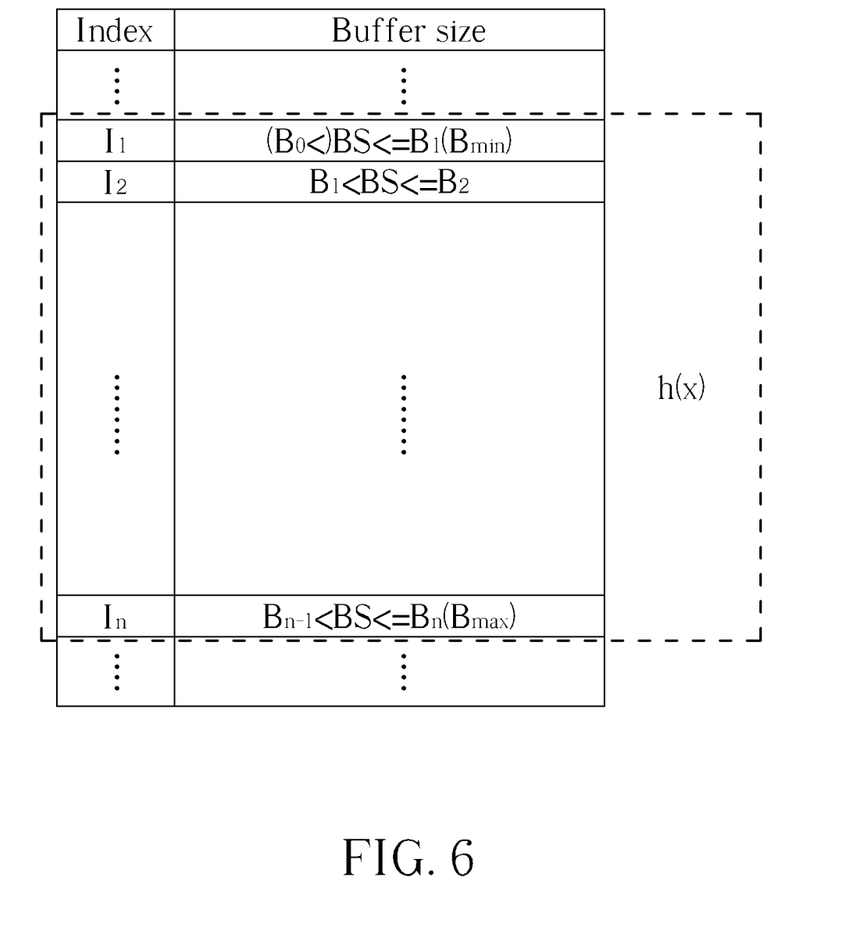

Please refer to FIG. 6, which illustrates a buffer size table according to a second embodiment. A part of the buffer size table is generated by a arithmetic sequence formula h(x), which is expressed as $a_i=a_1+(i-1)d$. Suppose that the minimum buffer size value is $B_{min}$ and the maximum buffer size value is $B_{max}$, and perform the following steps to generate the buffer size table.

Step 1: Consider a arithmetic sequence $a_1, a_2, \ldots a_n$, where $a_1=B_{min}$, $a_2=B_2$, ... and $a_n=B_{max}$.

Step 2: Derive the difference d of the arithmetic sequence by $d=(B_{max}-B_{mm})/(n-1)$.

Step 3: Get $a_i$ by the arithmetic sequence formula $h(x)=a_1+(i-1)d$, for $1<i<n$.

Step 4: Set the buffer size value Bi to be ceiling($a_i$) (or floor($a_i$)).

For example, assume the $B_0=150000$ byte, $B_{min}=160000$ byte, $B_{max}=3000000$ byte, n=100. Therefore, index='$1_1$' indicates 150000<BS<=160000, index='$1_2$' indicates 160000<BS<=188687, . . . , and index='$1_n$' indicates 2971314<BS<=3000000. With enlarged buffer size table, the buffer size of the logical channel group can be indicated precisely, so as to avoid that the network allocated insufficient resource to the UE.

Note that, in addition to the geometric sequence and the arithmetic sequence, the buffer size table may be generated by other sequences, such as a generalized arithmetic sequence, a harmonic sequence, and/or a prime sequence.

Figure 7:
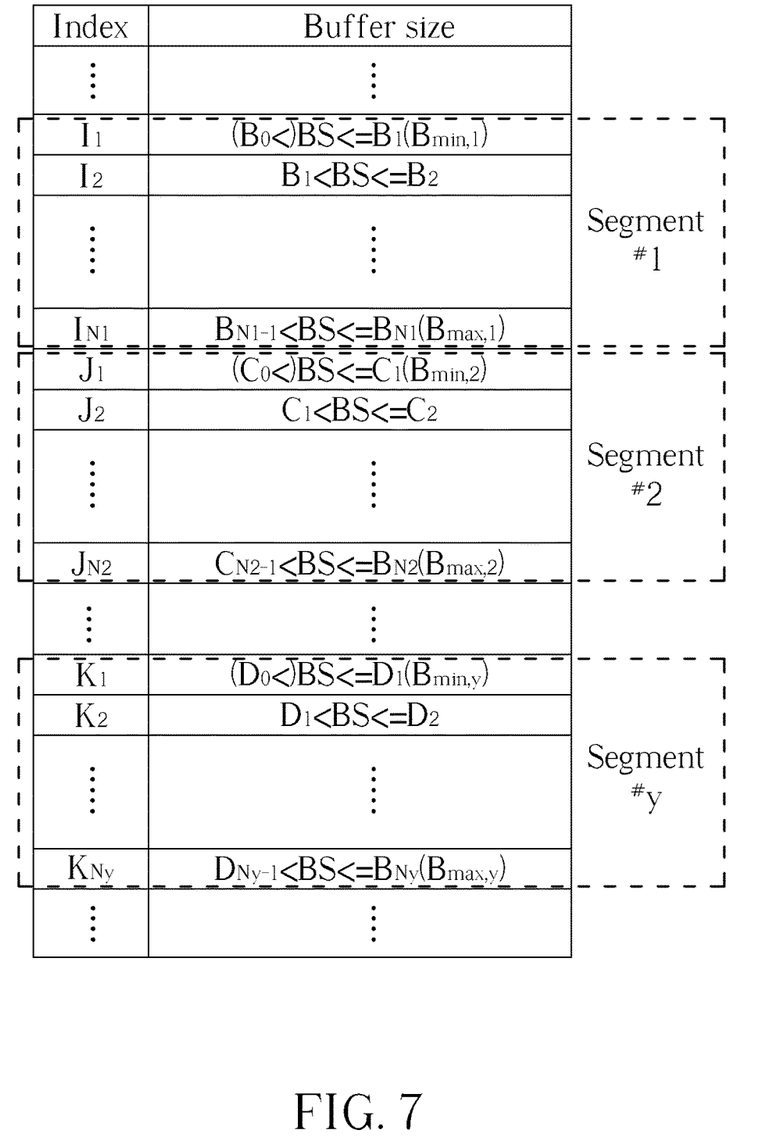

Please refer to FIG. 7, which illustrates a buffer size table according to a third embodiment. The buffer size table may be represented in X bits (X≥1), and segmented into Y segments (Y≥1). In Segment #i, the buffer size value is determined by a minimum buffer size value is $B_{min}$, a maximum buffer size value is $B_{max}$, and a buffer size level $N_i$ with $B_{min,1}=B_{min}$, $B_{max,1}=B_{max}$.

For example, assume X=6 bits (e.g. index='0'-'63'), Y=2 segments with $B_{min,1}=10$ byte, $B_{max,1}=150000$ byte, and $N_1=21$ in Segment #1, and $B_{min,2}=200000$ byte, $B_{max,2}=1200000$ byte, and $N_2=42$ in Segment #2. The formula which is applied in the Segment #1, #2 is expressed as $B_k=B_{min}*(1-p)^{k-1}$ with $p=1-(B_{max}/B_{min})^{1/(N-1)}$. Therefore, in Segment #1, index='1' indicates 0<BS<=10, index='2' indicates 10<BS<=17, . . . , and index='21' indicates 92745<BS<=150000. With such manner, in Segment #2, index='22' indicates $C_0=150000<BS<=200000$, . . . , and index='63' indicates 1148688<BS<=1200000.

Figure 8:
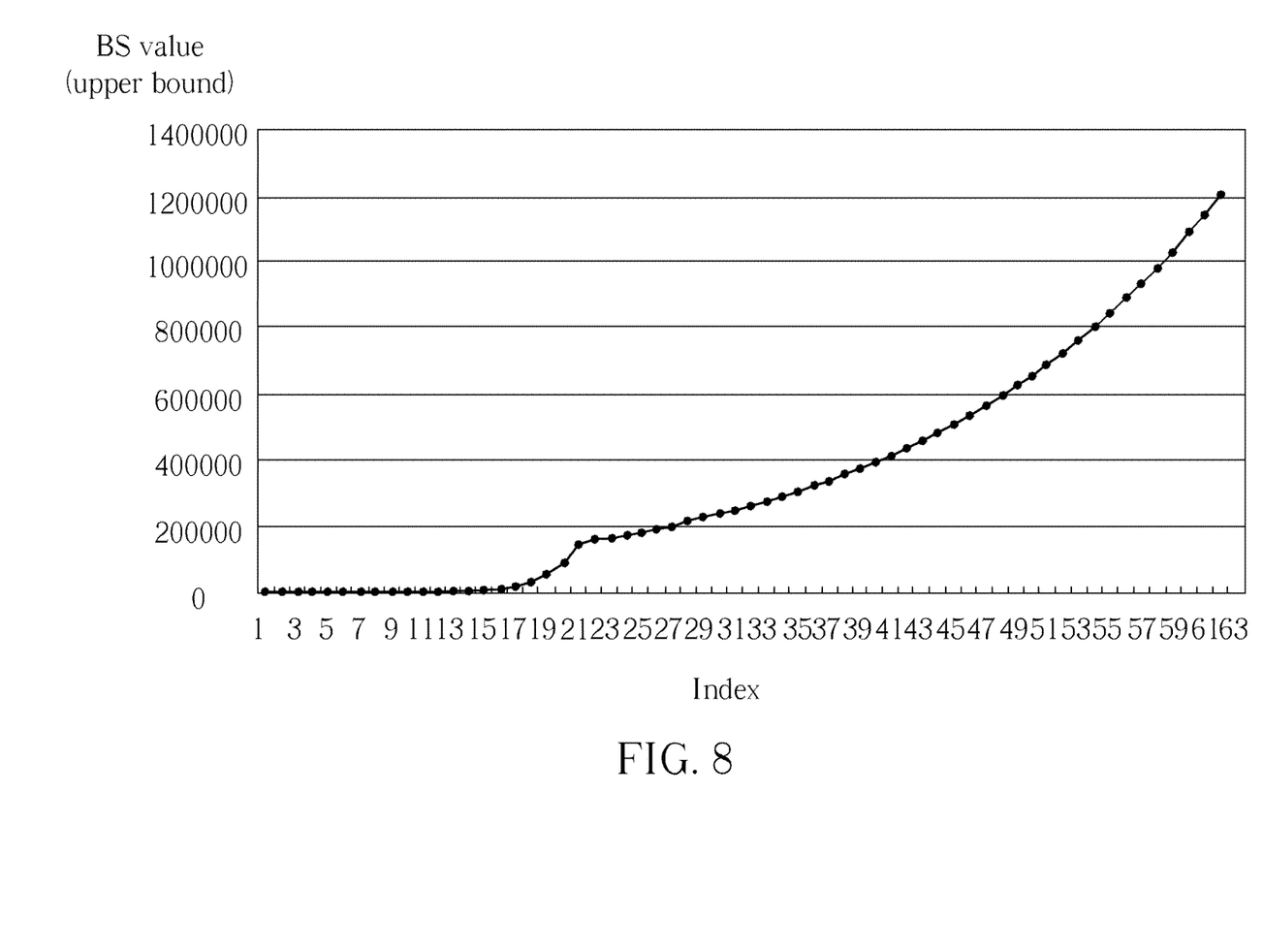
FIG. 8 illustrates a schematic diagram of buffer size value distribution.

Please refer to FIG. 8, which illustrates a schematic diagram of buffer size value distribution based on the abovementioned segmentation method. In FIG. 8, a gradual granularity (step size) is provided with the segmentation method, and thereby the buffer size of the logical channel group can be accurately indicated to the network, so that the UE can acquire sufficient resource for transmission.

Note that, segments may apply the same or different formulas. Moreover, the number of segments can be determined based on maximum transmittable data rate per uplink grant in LTE system (e.g. Rel-8/9 version), maximum transmittable data rate per uplink grant per component carrier in LTE-Advanced system (e.g. Rel-10 version or later version), the number of component carriers supported or configured in the system, and/or maximum step (maximum granularity) of buffer size value.

On the other hand, after the UE generates at least a buffer size table, the network (i.e. the eNB) or the UE determines which buffer size table is going to be use for the buffer status report. For network determination, the network may send a message to the UE in order to explicitly indicate which buffer size table the UE should use. For UE determination, the UE may use a first buffer size table initially, and may send a message to inform the eNB that the UE starts to use a second buffer size table, or the UE may use a bit (or bits) in the buffer size report to indicate which buffer size table is used in the buffer size report.

More specifically, the UE determines the buffer size table used for reporting the buffer size of logical channel groups based on the number of configured or activated component carriers, the bandwidth of the configured or activated component carriers, network/system versions (e.g. LTE system with Rel-8/9 version, LTE system with Rel-10 version, or LTE-Advanced system), network and/or UE capability (e.g. carrier aggregation capability, UL MIMO capability and/or bandwidth), UE category (e.g. hardware supports: antenna supports, such as SISO, SIMO, MISO, and MIMO), a buffer size of at least a logical channel group, support configuration of parallel PUCCH and PUSCH, and/or whether the (UL) MIMO is enabled or configured.

For the number of configured or activated component carriers, if only one component carrier is configured (or activated) to the UE, the UE may apply the conventional buffer size table (e.g. 6-bit buffer size table is sufficient for the buffer status report). After adding or removing a component carrier, the UE may use another buffer size table (e.g. another 6-bit enlarged buffer size table, 8-bit or 10-bit buffer size table). In a word, since in the LTE-Advance system the data rate is enormously increased, the UE generates at least a buffer size table and determines a proper buffer size table, which can accurately indicate the buffer size of the logical channel group, to use.

In conclusion, the present invention provides methods and apparatus for handling buffer status report, so as to accurately report the amount of data available for transmission to the network, thereby obtaining sufficient resource for transmission.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling buffer status report for a mobile device performing UL MIMO and/or performing reception and/or transmission on a plurality of component carriers in a wireless communication system, the method comprising:
   generating at least two buffer size tables each including a plurality of indexes, wherein some of the plurality of indexes each is used for indicating a data amount in an uplink buffer of the mobile device for the buffer status report;
   receiving a signaling that indicates which buffer size table of the at least two buffer size tables is used for the buffer status report, from a network of the wireless communication system; and
   triggering the buffer status report including one or four indexes of the plurality of indexes to a network of the wireless communication system when an explicit signaling is received from the network, a component carrier configuration is changed, a handover procedure is performed, a contention based transmission occurs, an uplink resource is allocated and a number of padding bits is larger or equal to a size of the buffer status report, a predetermined timer expires, or initially entering to the network;
   wherein generating the at least two buffer size tables comprises:
      segmenting at least one of the at least two buffer size tables into at least a segment; and
      generating the at least one of the at least two buffer size tables by utilizing at least a function or procedure to the at least a segment, wherein the at least a function or procedure is associated to a maximum uplink data transmission rate.

2. The method of claim 1, wherein the at least a function or procedure is associated to a geometric sequence, an arithmetic sequence, a generalized arithmetic sequence, a harmonic sequence, and/or a prime sequence.

3. The method of claim 1, wherein segmenting the buffer size table into at least a segment comprises:
   segmenting the buffer size table into the at least a segment according to at least one of a maximum transmittable data rate per uplink grant, a maximum transmittable data rate per uplink grant of a component carrier of the plurality of component carriers, a number of the plurality of component carriers, and a maximum granularity of a buffer size.

4. The method of claim 1 further comprising:
   determining a format of the buffer status report to report buffer sizes of one or four logical channel groups in the mobile device.

5. The method of claim 1 further comprising:
   autonomously determining which buffer size table of the at least two buffer size tables is used for the buffer status report according to at least one of a number of downlink and/or uplink component carriers, a bandwidth of the downlink and/or uplink component carriers, a version of a network of the wireless communication system, the network and/or the mobile device capability, hardware supports of the mobile device, at least a buffer size of at least a logical channel group, support configuration of parallel physical uplink control channel (PUCCH) and physical uplink shared channel (PUSCH), and whether an uplink multiple input multiple output (MIMO) is enable and/or configured.

6. The method of claim 5 further comprising:
   informing the network about the used buffer size table.

7. The method of claim 6, wherein informing the network about the used buffer size table comprises:
   sending a message to inform the network that the mobile device uses a first buffer size table of the at least two buffer size tables for the buffer status report; or
   using a bit or bits in the buffer status report to indicate the used buffer size table in the buffer status report.

8. A communication device of a wireless communication system for handling buffer status report, the communication device performing UL MIMO and/or performing reception and/or transmission on a plurality of component carriers and comprising:
   means for generating at least two buffer size tables each including a plurality of indexes, wherein some of the plurality of indexes each is used for indicating a data amount in an uplink buffer of the communication device for the buffer status report, wherein generating the at least two buffer size tables comprises:
      segmenting at least one of the at least two buffer size tables into at least a segment; and
      generating the at least one of the at least two buffer size tables by utilizing at least a function or procedure to the at least a segment, wherein the at least a function or procedure is associated to a maximum uplink data transmission rate;
   means for receiving a signaling that indicates which buffer size table of the at least two buffer size tables is used for the buffer status report, from a network of the wireless communication system; and
   means for triggering the buffer status report including one or four indexes of the plurality of indexes to a network of the wireless communication system when an explicit signaling is received from the network, a component carrier configuration is changed, a handover procedure is performed, a contention based transmission occurs, an uplink resource is allocated and a number of padding bits is larger or equal to a size of the buffer status report, a predetermined timer expires, or initially entering to the network.

9. The communication device of claim 8, wherein the at least a function or procedure is associated to a geometric sequence, an arithmetic sequence, a generalized arithmetic sequence, a harmonic sequence, and/or a prime sequence.

10. The communication device of claim 8, wherein the means for segmenting the buffer size table into at least a segment comprises:
    means for segmenting the buffer size table into the at least a segment according to at least one of a maximum transmittable data rate per uplink grant, a maximum transmittable data rate per uplink grant of a component carrier of the plurality of component carriers, a number of the plurality of component carriers, and a maximum granularity of a buffer size.

11. The communication device of claim 8 further comprising:
    means for determining a format of the buffer status report to reporting buffer sizes of one or four logical channel groups in the communication device.

12. The communication device of claim 8 further comprising:
    means for autonomously determining which buffer size table of the at least two buffer size tables is used for the buffer status report according to at least one of a number of downlink and/or uplink component carriers, a bandwidth of the downlink and/or uplink component carriers, a version of a network of the wireless communication system, the network and/or the communication device capability, hardware supports of the communication device, at least a buffer size of at least a logical channel group, support configuration of parallel physical uplink control channel (PUCCH) and physical uplink shared channel (PUSCH), and whether an uplink multiple input multiple output (MIMO) is enable and/or configured.

13. The communication device of claim 12 further comprising:
    means for informing the network about the used buffer size table.

14. The communication device of claim 13, wherein informing the network about the used buffer size table comprises:
    means for sending a message to inform the network that the communication device uses a first buffer size table of the at least two buffer size tables for the buffer status report; or
    means for using a bit or bits in the buffer status report to indicate the used buffer size table in the buffer status report.

* * * * *